(12) United States Patent
Schaeffer et al.

(10) Patent No.: US 8,210,984 B2
(45) Date of Patent: Jul. 3, 2012

(54) THRUST WASHER FOR A TRANSMISSION

(75) Inventors: Claus Schaeffer, Seelbach (DE); Willi Eppler, Ratshausen (DE)

(73) Assignee: Minebea, Co., Ltd, Nagano (JP)

( * ) Notice: Subject to any disclaimer, the term of this patent is extended or adjusted under 35 U.S.C. 154(b) by 480 days.

(21) Appl. No.: 12/540,970

(22) Filed: Aug. 13, 2009

(65) Prior Publication Data

US 2010/0081538 A1    Apr. 1, 2010

(30) Foreign Application Priority Data

Oct. 1, 2008   (DE) .................. 10 2008 050 187

(51) Int. Cl.
*F16H 57/08* (2006.01)
(52) U.S. Cl. ...................... 475/331; 475/347
(58) Field of Classification Search ............ 475/331
See application file for complete search history.

(56) References Cited

U.S. PATENT DOCUMENTS

| | | | |
|---|---|---|---|
| 6,106,429 A * | 8/2000 | Mortensen | 475/331 |
| 2007/0287581 A1* | 12/2007 | Parks et al. | 477/52 |
| 2008/0227577 A1* | 9/2008 | Goldschmidt et al. | 475/5 |

FOREIGN PATENT DOCUMENTS

| | | |
|---|---|---|
| EP | 1099882 | 3/2003 |
| EP | 1580459 | 9/2005 |
| EP | 1686290 | 8/2006 |

\* cited by examiner

*Primary Examiner* — Edwin A Young
(74) *Attorney, Agent, or Firm* — Duane Morris, LLP

(57) ABSTRACT

A central thrust washer for all planets of a planetary carrier of a planetary gear that is geometrically designed such that it engages in recesses in the annulus gear or the drive wheel or is connected to planetary wheel bearings of the planetary carrier so as to prevent any relative movement. For this purpose, at least one fixing element is provided on the thrust washer.

20 Claims, 3 Drawing Sheets

THRUST WASHER FOR A TRANSMISSION

RELATED APPLICATIONS

The instant application claims the priority benefit of German Patent Application Number 10 2008 050 187.5, filed Oct. 1, 2008, the entirety of which is incorporated herein by reference.

BACKGROUND OF THE INVENTION

The invention relates to a planetary gear and in particular to a thrust washer of a planetary gear. In transmissions, such as planetary gears, it is standard practice to dispose thrust washers at each planetary wheel, the thrust washers ensuring the correct support of the planetary wheels and the function of the transmission when subject to outside influences. EP1099882B1 thus describes the use of an elastic thrust washer between each planetary wheel and the planetary carrier, the thrust washer absorbing the axial thrust of a planetary wheel and also being deformable in its elastic region, to the extent that, even should the planetary carrier be deformed, the bearings of the planetary wheels have a uniform load and vibrations in the planetary gear are dampened.

EP1686290A1 and EP1580459A2 describe thrust washers that are likewise seated between each planetary wheel and the planetary carrier and that engage in corresponding recesses in the planetary carrier using fixing elements on the thrust washer taking the form of nubs or lugs, so that their exact position within the planetary gear is safeguarded even when subject to heavy loads.

A planetary gear made by IMS Gear GmbH Donaueschingen (DE) is known in which a thrust washer is inserted between the planetary wheels and the drive motor to prevent the planetary wheels from coming into contact with the motor flange during rotation. In contrast to the above-mentioned thrust washers, this thrust washer covers all planetary wheels of the planetary carrier of a first gear stage. The rotation of the planetary wheels produces a relative movement between the adjacent thrust washer and the annulus gear. A gear design is known in which this relative movement is prevented by bonding the thrust washer fixedly to the annulus gear.

If the thrust washer is not fixed or bonded, the rotation of the planetary wheels results in a movement of the thrust washer with respect to the annulus gear. Depending on the material of the annulus gear, the movement of the thrust washer may result in the thrust washer cutting into the toothed rim of the annulus gear. This produces wear that becomes established in the gearing and leads to premature failure of the transmission.

The same problem is found in those thrust washers that are disposed in multistage planetary gears between the individual gear stages and which protect the planetary wheels of one gear stage against the planetary carrier of an adjacent gear stage. If the thrust washer is not firmly fixed, the problem again arises here of the thrust washer cutting into one of the gear parts.

Although bonding the thrust washer may solve the above-mentioned problem, it represents extra work and expense in terms of process engineering. The process of bonding a thrust washer involves cleaning the bonded surfaces, the precise mechanical application of a defined amount of adhesive and the setting of the adhesive. Not only does this require additional materials, it also means that the manufacturing cycle is greatly prolonged.

SUMMARY OF THE INVENTION

It is thus an object of the invention to provide a transmission having a thrust washer in which the thrust washer is fixed in its position without the use of any additional resources, such as adhesive, and requiring little effort and expense in terms of process engineering.

This object has been achieved according to the invention by a transmission having the characteristics outlined in the independent claim.

The invention describes a planetary gear having a thrust washer where the thrust washer is geometrically designed such that it has protrusions or recesses with which it engages in gear parts and which secure it in its position.

In a preferred embodiment of the invention, the thrust washer has at least one radially arranged protrusion on its outside circumference that is made to engage in an internal toothing of the annulus gear. A thrust washer that does not have a meshing protrusion would be turned by the movement of the planetary wheels, which would result in the thrust washer cutting into the annulus gear. This produces wear that becomes established in the gearing and leads to premature failure of the transmission. This is prevented by a thrust washer according to the invention.

In another preferred embodiment of the invention radial protrusions are fixed to the outside contour of the thrust washer, the radial protrusions engaging in recesses in the annulus gear that are used for receiving the fixing elements of the drive motor.

In a further preferred embodiment radial protrusions are provided on the inner circumference of the thrust washer. In this case, the thrust washer is slid onto the sun wheel of a first gear stage and protects the end faces of the planetary wheels of a second gear stage.

In a particularly preferred embodiment of the invention the radial protrusions of the thrust washer are integrally formed as one piece with the thrust washer. It is most preferable if three protrusions are provided, being triangular or trapezoidal in shape or taking any other form that is suitable for preventing the thrust washer from turning by engaging in a gear part.

In a further embodiment of the invention, the thrust washer is provided with recesses so that it engages with the planetary wheel bearings of a planetary carrier and is fixedly supported on the planetary carrier so as to prevent rotation. The thrust washer is here disposed within a gear stage and protects the planetary wheels of a planetary carrier against the planetary carrier.

The disk or annular disk-shaped thrust washer is principally manufactured as a flat stamped part made of a metallic material or a metal alloy, which makes its manufacture particularly simple and cost-effective so that utilization of the thrust washer according to the invention can be seamlessly integrated in the manufacturing process of the transmission. However, it may also be made of other materials such as plastics that are processed using a molding method. Low-friction materials such as Teflon™ may be used as a coating or additive.

Preferred embodiments of the invention are described in more detail on the basis of the drawings. Further characteristics and advantages of the invention can be derived from this.

DESCRIPTION OF PREFERRED
EMBODIMENTS OF THE INVENTION

Figure 1:
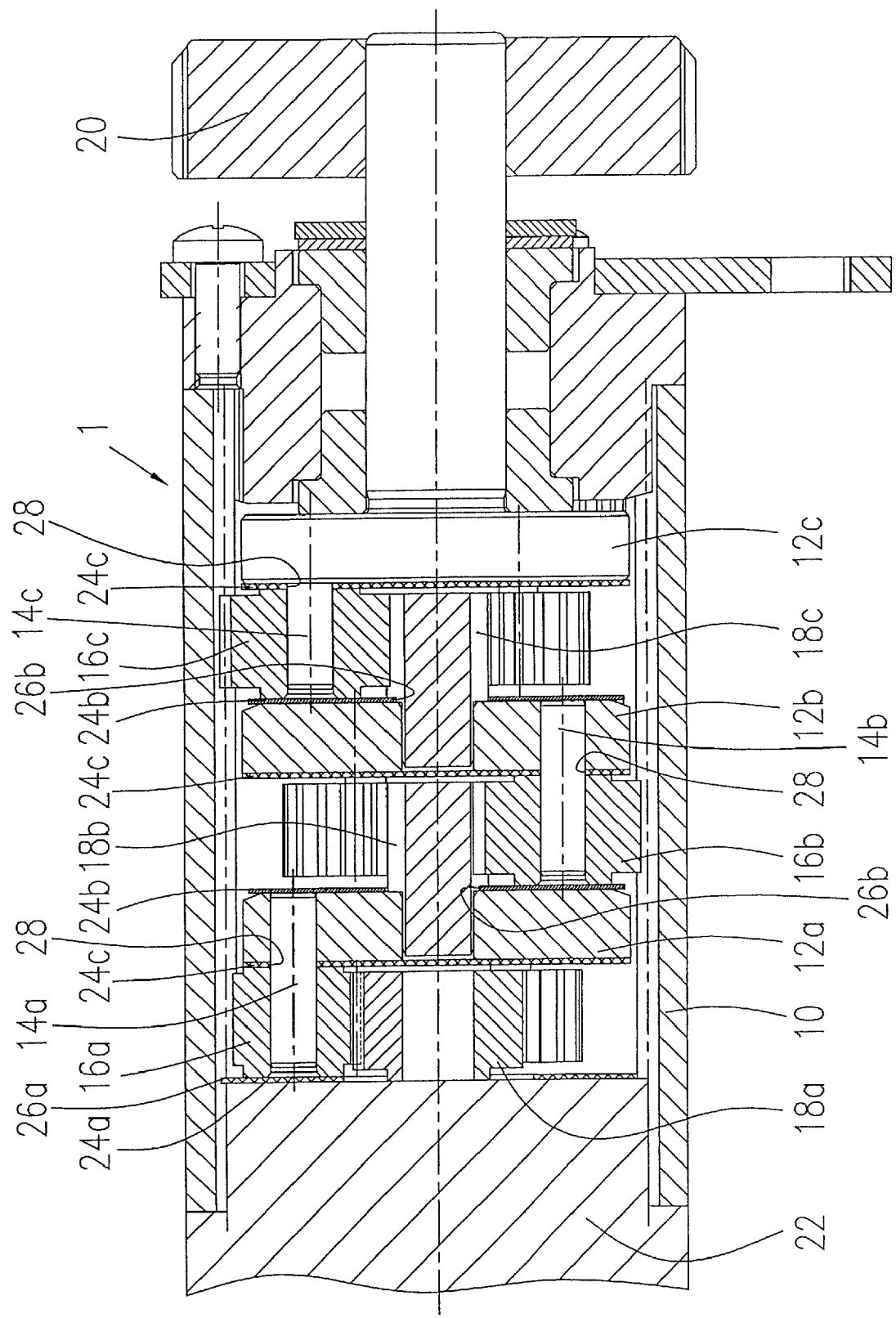
FIG. 1 is a longitudinal section through a planetary gear.

FIG. 1 shows a longitudinal section through a three-stage planetary gear 1 that is driven by a motor 22. The motor has a motor output 18a that forms the drive of the planetary gear. The planetary gear 1 comprises a stationary annulus gear 10, a first sun wheel 18a, a second sun wheel 18b, a third sun wheel 18c and a gear output 20, a planetary carrier 12a of a first gear stage, a planetary carrier 12b of a second gear stage and a planetary carrier 12c of a third gear stage, planetary wheel bearings 14a of the first gear stage, planetary wheel bearings 14b of the second gear stage and planetary wheel bearings 14c of the third gear stage, planetary wheels 16a of the first gear stage, planetary wheels 16b of the second gear stage and planetary wheels 16c of the third gear stage, a first thrust washer 24a having radial protrusions 26a, two further thrust washers 24b having radial protrusions 26b and a thrust washer 24c having recesses 28.

The axially aligned motor output forms the sun wheel 18a of the first gear stage and is in mesh with the planetary wheels 16a of the first gear stage disposed radially about the sun wheel 18a, the planetary wheels 16a of the first gear stage in turn meshing with the annulus gear 10. The planetary wheels 16a are rotatably supported on the planetary wheel bearings 14a of the planetary carrier 12a. Any rotation of the sun wheel 18a drives the planetary wheels 16a that mesh with the stationary annulus gear 10 and thus drive the planetary carrier 12a. Fixedly connected to the planetary carrier 12a, the sun wheel 18b of the second gear stage disposed coaxial to sun wheel 18a is set in motion. This sun wheel 18b in turn is in mesh with the planetary wheels 16b of the second gear stage disposed radially about the sun wheel 18b. The planetary wheels 16b are rotatably supported on the planetary wheel bearings 14b of the planetary carrier 12b. The rotation of sun wheel 18b drives the planetary wheels 16b that mesh with the stationary annulus gear 10 and thus drive the planetary carrier 12b and thus simultaneously the sun wheel 18c of the third gear stage connected to the planetary carrier 12b. Sun wheel 18c is likewise in mesh with the planetary wheels 16c of the third gear stage disposed radially about the sun wheel 18c. The planetary wheels 16c are rotatably supported on the planetary wheel bearings 14c of the planetary carrier 12c. The rotation of the sun wheel 18c drives the planetary wheels 16c that mesh with the stationary annulus gear 10 and thus drive the planetary carrier 12c. The output 20 of the planetary gear is connected to the planetary carrier 12c.

The planetary gear 1 of FIG. 1 is used by way of example to explain the application of the thrust washers 24a, 24b according to the invention. They may, however, also find application in planetary gears having a different design.

The thrust washer 24a rests with one surface against the motor flange 22, and with the opposite surface against the end faces of the planetary wheels 16a of the first gear stage. The thrust washer 24a takes the form of an annular disk, the motor flange 22 engaging with its motor output 18a through the central opening of the thrust washer 24a into the planetary wheels 16a of the first gear stage. To ensure that the thrust washer 24a does not come into contact with the sun wheel 18a, its inside diameter is larger than the outside diameter of the sun wheel 18a. Due to the movement of the planetary wheels, a thrust washer according to the prior art would be forced into a relative movement about the central axis and would cut into the annulus gear.

Using fixing elements that take the form in FIG. 1 of three radial protrusions 26a which are preferably distributed evenly over the outside circumference of the thrust washer 24a, the thrust washer 24a according to the invention engages in the toothing of the annulus gear 10, which goes to prevent any movement of the thrust washer 24a with respect to the annulus gear 10 and thus also prevents the thrust washer 24a from cutting into the annulus gear 10. The thrust washer 24a is used as a sliding bearing surface for the end faces of the planetary wheels 16a, which goes to prevent any mutual wear of the motor flange 22 and the planetary wheels 16a.

The thrust washer 24b according to the invention is disposed between two adjacent gear stages. In the embodiment illustrated in FIG. 1, two thrust washers 24b are provided, one between the first and the second gear stage and one between the second and the third gear stage. The thrust washer 24b rests with one surface against the planetary carrier 12a, 12b of a gear stage and with the other surface against end faces of the planetary wheels 16b, 16c of an adjacent higher gear stage. The thrust washer 24b takes the form of an annular disk, the sun wheel 18b, 18c disposed on the planetary carrier 12a, 12b engaging through the opening in the thrust washer 24b into the planetary wheels 16b, 16c.

The thrust washer 24b according to the invention is disposed between the planetary wheels 16b, 16c of a gear stage and the planetary carrier 12a, 12b of an adjacent gear stage. For this purpose, the thrust washer 24b has an inner hole with fixing elements disposed there taking the form of radial protrusions 26b that are preferably distributed evenly over the circumference of the inner hole of the thrust washer 24b and which engage in the toothing of the sun wheel 18b, 18c of the respective planetary carrier 12a, 12b. To ensure that the thrust washer 24b does not come into contact with the annulus gear 10, its outside diameter is smaller than the inside diameter of the annulus gear 10. The thrust washer 24b provides a sliding bearing surface for the end face of the planetary wheels 16b, 16c and prevents the end faces of the planetary wheels 16b, 16c from rubbing abrasively against the planetary carrier 12a, 12b.

The thrust washer 24c according to the invention is disposed within a gear stage. Three thrust washers 24c are provided that are associated with the three gear stages. The thrust washer 24c rests with one surface against each of the end faces of the planetary wheels 16a, 16b, 16c and with the other surface against the corresponding planetary carrier 12a, 12b, 12c. The thrust washer takes the form of a disk, the thrust washer 24c having recesses 28 that correspond in terms of size and number with the planetary wheel bearings 14a, 14b, 14c of the planetary carriers 12a, 12b, 12c. The planetary wheel bearings 14a, 14b, 14c engage through the recesses 28 in the thrust washer 24c. The outside diameter of the thrust washer 24c is smaller than the inside diameter of the annulus gear 10, so that this thrust washer 24c as well does not cut abrasively into the annulus gear. The thrust washer 24c provides a sliding bearing for one end face of the planetary wheels 16a, 16b, 16c and prevents the planetary wheels 16a, 16b, 16c from rubbing against the planetary carrier 12a, 12b, 12c.

Figure 2:
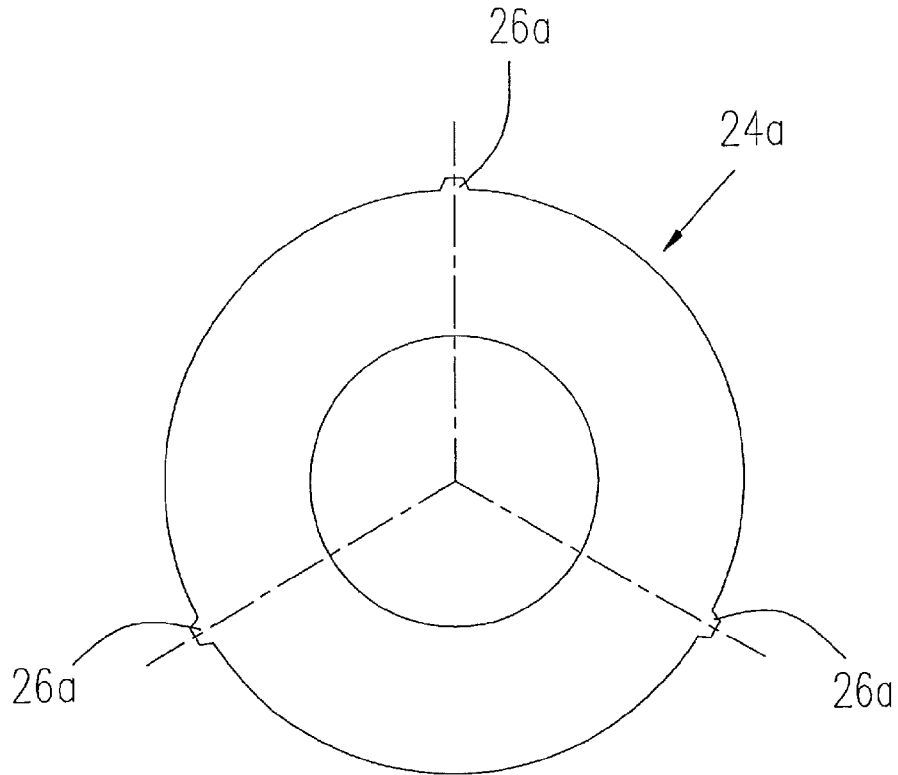
FIG. 2 is a view from above of a thrust washer according to a first embodiment variant.

FIG. 2 shows a view from above of a thrust washer 24a according to a first embodiment variant of the invention. The thrust washer has a central hole which, for ease of assembly, has a larger diameter than the diameter of the sun wheel 18a. A larger inside diameter for the thrust washer additionally ensures that the thrust washer does not come into abrasive contact with the sun wheel. Radial protrusions 26a designed as trapezoidal teeth are formed at the outside circumference of the thrust washer 24a, the radial protrusions forming a counter-toothing to the toothing of the annulus gear 10 so that they can engage into this toothing. A movement of the thrust washer 24a with respect to the annulus gear is thus precluded and the thrust washer 24a cannot cut into the annulus gear 10.

Figure 3:
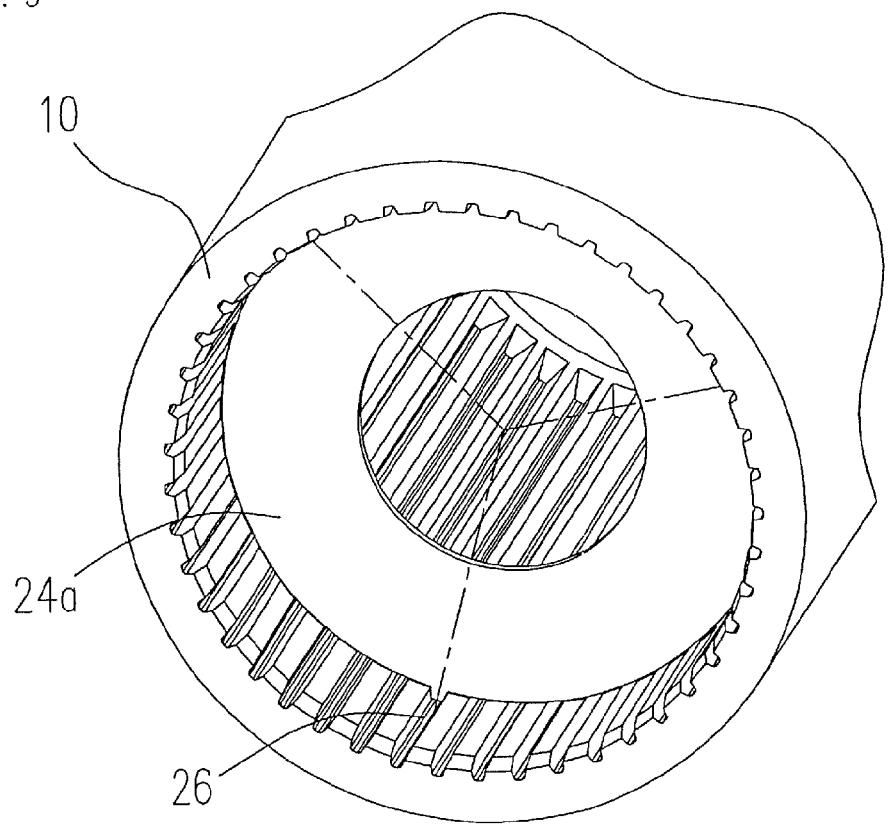
FIG. 3 is a perspective view of a first embodiment variant of the invention.

FIG. 3 shows a thrust washer 24a according to FIG. 2 that is fixedly disposed in an annulus gear 10 so as to prevent rotation.

Figure 4:
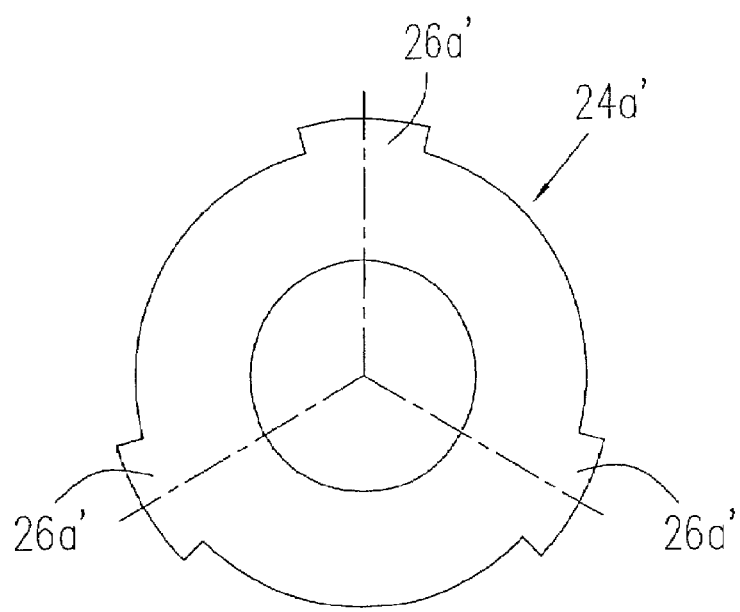
FIG. 4 is a view from above of a thrust washer according to a second embodiment variant.

FIG. 4 shows a view from above of a second embodiment variant of a thrust washer 24a'. Radial protrusions 26a' are formed on the outside circumference of the thrust washer 24a'. These protrusions 26a' provide a negative to the recesses in an annulus gear which are used, for example, for receiving the fixing elements of the drive motor.

Figure 5:
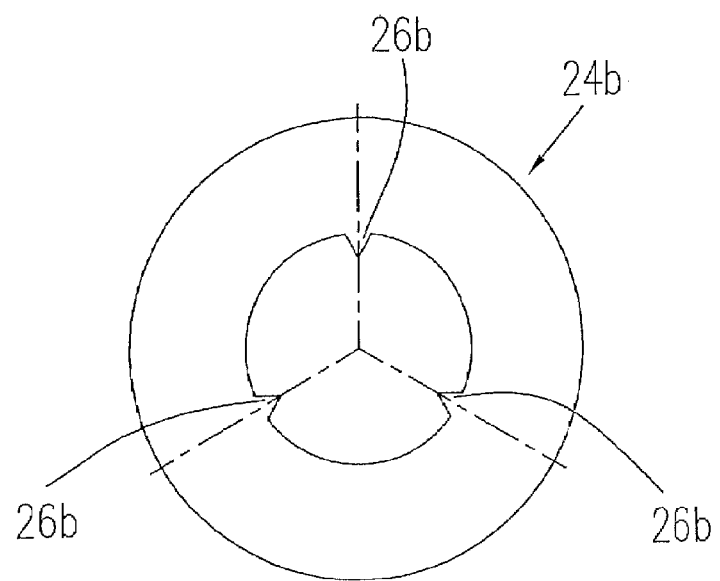
FIG. 5 is a view from above of a thrust washer according to a third embodiment variant.

FIG. 5 shows a view from above of a third embodiment variant of a thrust washer 24b. Radial protrusions 26b taking the form of toothing are formed on the inside radius of the thrust washer 24b, the teeth providing a counter-toothing to the toothing of the drive wheel or sun wheel of a gear stage.

Figure 6:
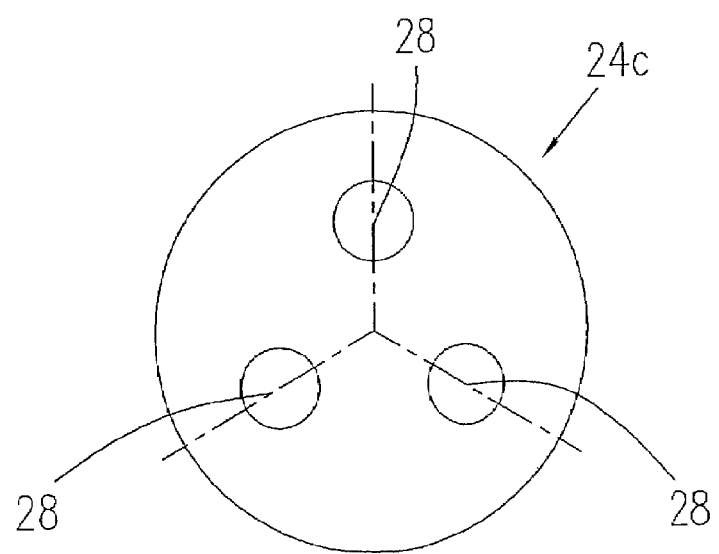
FIG. 6 is a view from above of a thrust washer according to a fourth embodiment variant.

FIG. 6 shows a view from above of a fourth embodiment variant of a thrust washer 24c. The thrust washer has recesses 28 that are designed such that the thrust washer 24c can be slid onto the planetary wheel bearings 14a, b, c, so as to be fixedly supported in a non-rotatable way with respect to the planetary carrier 12a, b, c. The thrust washer 24c is disposed between the planetary carrier 12a, b, c of a gear stage and the end faces of the planetary wheels 16a, b, c of the same gear stage. This embodiment of a thrust washer protects the planetary wheels 16a, b, c against the planetary carrier 12a, b, c and acts as a sliding bearing for the end face of the planetary wheel 16a, b, c.

We claim:

1. A transmission having at least one gear stage that has a sun wheel, a planetary carrier having planetary wheel bearings and at least two planetary wheels that are disposed in an annulus gear and having a thrust washer that is disposed coaxially to the sun wheel at end faces of the planetary wheels and that forms a sliding surface for the end face of all planetary wheels of a gear stage, wherein the thrust washer engages with the inside surface of the annulus gear or the outside surface of the sun wheel to fixedly connect the thrust washer with the inside surface of the annulus gear or the outside surface of the sun wheel to prevent relative rotation.

2. A transmission according to claim 1, wherein the thrust washer is an annular disk having a central inner hole.

3. A transmission according to claim 1, wherein the thrust washer is a disk.

4. A transmission according to claim 1, wherein the transmission is connected via a motor flange to a motor whose output is formed by the sun wheel of the first gear stage, and wherein the thrust washer is disposed between the motor flange and the end faces of the planetary wheels of the first gear stage.

5. A transmission according to claim 4, wherein the thrust washer is disposed between the first gear stage close to the motor and a subsequent second gear stage remote from the motor.

6. A transmission according to claim 5, wherein the thrust washer is fixedly supported against the first gear stage close to the motor to prevent rotation.

7. A transmission according to claim 4, wherein the thrust washer is fixedly supported against the motor flange to prevent relative rotation.

8. A transmission according to claim 1, wherein the thrust washer is disposed within a gear stage.

9. A transmission according to claim 8, wherein the thrust washer has recesses engaging with the planetary wheel bearings of a gear stage, and wherein the thrust washer is disposed between the planetary carrier and the end faces of the planetary wheels of this gear stage.

10. A transmission according to claim 1, wherein the thrust washer is made of a metallic material, a metal alloy or a plastic.

11. A transmission according to claim 10, wherein the thrust washer is manufactured as a stamped part.

12. A transmission according to claim 1, wherein the thrust washer is coated with a low friction material.

13. A transmission according to claim 1, wherein a plurality of thrust washers are contained within a planetary gear.

14. A transmission according to claim 1, wherein the thrust washer has at least one radial protrusion engaging in the inside toothing of the annulus gear or the outside toothing of the sun wheel.

15. A transmission having at least one gear stage that has a sun wheel, a planetary carrier having planetary wheel bearings and at least two planetary wheels that are disposed in an annulus gear and having a thrust washer that is disposed coaxially to the sun wheel at end faces of the planetary wheels and that forms a sliding surface for the end face of all planetary wheels of a gear stage, wherein the thrust washer engages with the inside surface of the annulus gear, the outside surface of the sun wheel or the planetary wheel bearings of the planetary carrier-to fixedly connect the thrust washer with the inside surface of the annulus gear, the outside surface of the sun wheel or the planetary wheel bearings of the planetary carrier to prevent relative rotation, wherein the thrust washer has at least one radial protrusion engaging in the inside toothing of the annulus gear or the outside toothing of the sun wheel.

16. A transmission according to claim 15, wherein the radial protrusion is integrally formed as one piece with the thrust washer.

17. A transmission according to claim 16, wherein the radial protrusion is in the form of a triangular point.

18. A transmission according to claim 16, wherein the radial protrusion is in the form of a trapezoid.

19. A transmission according to claim 15, wherein the thrust washer has three radial protrusions that are evenly distributed over the circumference thereof.

20. A transmission having at least one gear stage that has a sun wheel, a planetary carrier having planetary wheel bearings and at least two planetary wheels that are disposed in an annulus gear and having a thrust washer that is disposed coaxially to the sun wheel at end faces of the planetary wheels and that forms a sliding surface for the end face of all planetary wheels of a gear stage, wherein the thrust washer engages with the inside surface of the annulus gear, the outside surface of the sun wheel or the planetary wheel bearings of the planetary carrier-to fixedly connect the thrust washer with the inside surface of the annulus gear, the outside surface of the sun wheel or the planetary wheel bearings of the planetary carrier to prevent relative rotation ; wherein the transmission is connected via a motor flange to a motor whose output is formed by the sun wheel of the first gear stage, and wherein the thrust washer is disposed between the motor flange and the end faces of the planetary wheels of the first gear stage wherein the thrust washer is fixedly supported against the motor flange to prevent relative rotation.

* * * * *